United States Patent
Starratt et al.

(10) Patent No.: US 12,135,978 B1
(45) Date of Patent: Nov. 5, 2024

(54) METHODS AND SYSTEMS FOR IMPLEMENTING AN INTELLIGENT DIGITAL ASSISTANT IN A MULTI-APPLICATION NETWORK

(71) Applicant: Black Knight IP Holding Company, LLC, Jacksonville, FL (US)

(72) Inventors: Kara S. Starratt, Jacksonville, FL (US); David W. Denson, Jacksonville, FL (US); James A. Iredale, Ponte Vedra Beach, FL (US); Sandra T. Madigan, Jacksonville, FL (US); Erik J. Skinner, Sturgeon Bay, WI (US); Lesley Grimes, Jacksonville, FL (US)

(73) Assignee: BLACK KNIGHT IP HOLDING COMPANY, LLC, Jacksonville, FL (US)

( * ) Notice: Subject to any disclaimer, the term of this patent is extended or adjusted under 35 U.S.C. 154(b) by 0 days.

(21) Appl. No.: 18/373,771

(22) Filed: Sep. 27, 2023

(51) Int. Cl.
  *G06F 3/00* (2006.01)
  *G06F 9/451* (2018.01)
  *G06F 9/54* (2006.01)

(52) U.S. Cl.
  CPC .............. *G06F 9/453* (2018.02); *G06F 9/54* (2013.01)

(58) Field of Classification Search
  CPC .......................................................... G06F 9/54
  USPC ........................................................ 719/328
  See application file for complete search history.

(56) References Cited

U.S. PATENT DOCUMENTS

| | | | |
|---|---|---|---|
| 9,130,900 B2* | 9/2015 | Tran ............... | G06Q 10/1093 |
| 9,830,187 B1* | 11/2017 | Blaine ............ | G06F 9/4881 |
| 10,068,301 B2 | 9/2018 | Kogut-O'Connell et al. | |
| 10,810,361 B1 | 10/2020 | Venkatraman et al. | |
| 10,963,316 B2* | 3/2021 | Gopalan .......... | G06F 8/36 |
| 11,379,268 B1 | 7/2022 | Gupta | |
| 11,379,897 B1 | 7/2022 | Thomas | |
| 2002/0002453 A1 | 1/2002 | Lazaridis et al. | |
| 2002/0078432 A1 | 6/2002 | Charisius et al. | |

(Continued)

OTHER PUBLICATIONS

Qiao Huang, API Method Recommendation without Worrying about the Task—API Knowledge Gap. (Year: 2018).*

(Continued)

*Primary Examiner* — Lechi Truong
(74) *Attorney, Agent, or Firm* — Baker & McKenzie LLP

(57) ABSTRACT

The disclosed method for implementing a digital assistant in a multi-application network includes: receiving an input command from a computing device; analyzing the input command; determining based on the analysis of the input command, a digital request data object associated with the input command; resolving the input command into a data string; determining, based on the digital request data object and the data string, intent data; and generating based on the intent data, a first set of operation recommendations comprising a first operation recommendation. The methods also include determining an application programming interface (API) associated with the first application; connecting the API to the first application; and executing the first operation recommendation to generate a computing operation result; and rendering the computing operation on a single graphical interface comprising a consolidation of a plurality of graphical interfaces associated with the first set of computing operation recommendations.

18 Claims, 7 Drawing Sheets

(56) References Cited

U.S. PATENT DOCUMENTS

| | | |
|---|---|---|
| 2002/0138449 A1 | 9/2002 | Kendall et al. |
| 2003/0233374 A1 | 12/2003 | Spinola et al. |
| 2004/0215552 A1 | 10/2004 | Horn et al. |
| 2005/0028073 A1 | 2/2005 | Henry et al. |
| 2005/0165734 A1 | 7/2005 | Vicars et al. |
| 2006/0069596 A1 | 3/2006 | Hatoun et al. |
| 2006/0069605 A1 | 3/2006 | Hatoun et al. |
| 2006/0074714 A1 | 4/2006 | Aziz et al. |
| 2008/0114791 A1 | 5/2008 | Takatsu et al. |
| 2009/0276340 A1 | 11/2009 | Knapp |
| 2010/0050153 A1 | 2/2010 | Louie et al. |
| 2010/0070464 A1 | 3/2010 | Aymeloglu et al. |
| 2011/0055180 A1 | 3/2011 | Lumley et al. |
| 2011/0282707 A1 | 11/2011 | Rangaswamy et al. |
| 2013/0152021 A1 | 6/2013 | Hatfield et al. |
| 2013/0212151 A1 | 8/2013 | Herbach et al. |
| 2014/0047028 A1 | 2/2014 | Buth |
| 2014/0351115 A1 | 11/2014 | Dahiwadkar |
| 2015/0134600 A1 | 5/2015 | Eisner et al. |
| 2016/0104067 A1* | 4/2016 | Xu .................. H04L 67/306 706/46 |
| 2018/0121217 A1* | 5/2018 | Jarabek ................. G06F 9/546 |
| 2019/0268462 A1* | 8/2019 | Yim .................... H04M 1/656 |
| 2020/0151630 A1 | 5/2020 | Shakhnovich |
| 2020/0320407 A1* | 10/2020 | Xiao .................. G06F 16/214 |
| 2020/0341834 A1 | 10/2020 | Safary et al. |
| 2020/0372088 A1* | 11/2020 | Liu .................. G06F 16/9532 |
| 2020/0394612 A1 | 12/2020 | Khokhar et al. |
| 2020/0410395 A1* | 12/2020 | Ray ...................... G06N 3/006 |
| 2021/0089375 A1* | 3/2021 | Ghafourifar ............ G06F 9/543 |
| 2021/0192134 A1* | 6/2021 | Yue .................. G06F 16/3326 |
| 2022/0358286 A1* | 11/2022 | Wilson-Thomas ... G06F 40/274 |
| 2023/0066058 A1* | 3/2023 | Yadav ................ G09B 19/0053 |
| 2023/0119035 A1 | 4/2023 | Mee |
| 2023/0125194 A1* | 4/2023 | Mertens ................ G06F 40/103 704/235 |
| 2023/0134235 A1* | 5/2023 | Setlur ..................... G06F 16/26 707/722 |

OTHER PUBLICATIONS

Oracle, "What is a Digital Assistant?", Feb. 8, 2023 snapshot via Archive.org, URL Link:oracle.com/chatbots/what-is-a-digital-assistant/> Accessed Nov. 2023 (Year: 2023), 3 pages.

Workgrid, "What is a Digital Assistant?", Jun. 1, 2023 snapshot via Archive.org, URL Link:<https://workgrid.com/article/what-is-a-digital-assistant> Accessed Nov. 2023 (Year: 2023), 2 pages.

* cited by examiner

METHODS AND SYSTEMS FOR IMPLEMENTING AN INTELLIGENT DIGITAL ASSISTANT IN A MULTI-APPLICATION NETWORK

TECHNICAL FIELD

The present disclosure relates to methods, systems and computer program products that facilitate the implementation and usage of a digital assistant in a multi-application network.

BACKGROUND

Integrating and leveraging data from multiple applications and/or domains associated with a multi-application network is needed to facilitate process optimizations as well as efficient data cataloging, data tracking, exception event handling, and data contextualization, and/or data storage.

SUMMARY

The present disclosure is directed to methods, systems, and computer program products that implement a digital assistant in a multi-application network. The methods, for example, may include using a data engine to receive via an interrogator control input field, a first input command from a computing device. The first input command may include a natural language input. For example, the natural language input may include one or more text or character strings associated with spoken and/or written language (e.g., English language, French language, Portuguese language, Chinese language, Japanese language, Korean language, Dutch language, etc.). The methods may also include using the data engine to analyze, based on a data model, the first input command. In one embodiment, the data model comprises a large language model. The large language model, according to some embodiments, comprises an artificial intelligence (AI) model configured to process or otherwise analyze vast amounts of character strings associated with the spoken and/or written language. In some embodiments, the methods include using the data engine to determine, based on the analysis of the first input command, a digital request data object associated with the first input command. The digital request data object may comprise a document or a file that outlines or is associated with one or more of: account data associated with the digital request data object; or parametric data associated with resolving one or more exception events associated with the digital request data object. The methods may also include using the data engine to resolve, based on the analysis of the first input command, the first input command into a data string. The data string may comprise textual data (e.g., string of characters) and/or vocal or auditory data defining or indicating a word, a phrase, or a sentence associated with the written or spoken language. In one embodiment, the data string comprises a sequence of characters including letters, numbers, symbols, and blank spaces as the case may require. The methods may further include using the data engine to determine, based on the digital request data object and the data string, intent data which may be subsequently used to generate a first set of operation recommendations comprising a first operation recommendation and a second operation recommendation. In exemplary embodiments, the methods further include using the data engine to receive, a selection of the first operation recommendation to determine a first application associated with the first operation recommendation. The methods, may further include using the data engine to determine a first application programming interface associated with the first application and subsequently connecting the first application programming interface to the first application. Furthermore, the methods include using the data engine to execute the first operation recommendation using the first application thereby resulting in a first computing operation result. According to some embodiments, the methods include using the data engine to transmit, to the computing device (e.g., a tablet, a mobile device, etc.), the first computing operation result. The data engine may be further used to receive, using the data engine, a selection of the second operation recommendation. In response to receiving the selection of the second operation recommendation, the data engine may determine a second application, different from the first application, associated with the second operation recommendation. The data engine may be further used to determine the first application programming interface or a second application programming interface associated with the second application and connect, using the first application programming interface or the second application programming interface, to the second application. The data engine may be further used to execute, using the second application, the second operation recommendation, thereby resulting in a second computing operation result different from the first computing operation result. According to one embodiment, the data engine may transmit to the computing device, the second computing operation result.

These and other implementations may each optionally include one or more of the following features. The data engine may be further used to generate, for example, at least context data (e.g., new or updated context data) associated with the digital request data object or the first computing operation result. In one embodiment, the context data indicates one or more of an exception event or a processing stage associated with the digital request data object. Moreover, the data engine may be used to initiate the display of the context data and/or the first computing result associated with the digital request data object on a graphical user interface. The graphical user interface may comprise, for example, a consolidation of a plurality of graphical user interfaces associated with the first application or a plurality of applications associated with the first set of operation recommendations, or a condensation of a plurality of display elements associated with the first application.

The data engine, may be used, according to some embodiments, to automatically format one or more of: the first computing operation result for display on the first graphical user interface based on the context data (e.g., the new or updated context data); or a second set of operation recommendations that are generated based on the first operation recommendation or the context data (e.g., the new or updated context data). Furthermore, the data engine may be used to detect, using the context data, an exception event associated with the digital request data object. Based on detecting the exception event, the data engine may be used to generate a second set of operation recommendations indicating a stage-wise progression of operations that resolve the exception event. In one embodiment, the data engine may transmit the second set of operation recommendations for display on the first computing device. In some embodiments, the digital assistant is associated with the multi-application network such that the multi-application network is configured for multi-application data processing associated with a plurality of domains comprised in a digital processing space. In addition, the first application may comprise one of: an application native to the multi-application network; or an application that is not native to the multi-application network. In some embodiments, the parametric data referenced above in association with digital request data object comprises one or more identifier data associated with the digital request data object and/or quantitative data associated with the digital request data object and/or exception event data associated with the digital request data object. Furthermore, the data model may be configured to track or assimilate a trajectory of a plurality of input commands including the first input command leading to a selection of specific operation recommendations including the first operation recommendation. Based on the tracking, the data model may be optimized and used by the data engine to recommend a second set of operation recommendations for display on a graphical user interface associated with the first computing device or a second computing device.

BRIEF DESCRIPTION OF THE DRAWINGS

The disclosure is illustrated by way of example, and not by way of limitation in the figures of the accompanying drawings in which like reference numerals are used to refer to similar elements. It is emphasized that various features may not be drawn to scale and the dimensions of various features may be arbitrarily increased or reduced for clarity of discussion. Further, some components may be omitted in certain figures for clarity of discussion.

DETAILED DESCRIPTION

Multi-Application Network

It is increasingly becoming needful to leverage computational tools that automatically recognize relationships among a plurality of disparate data associated with a given multi-application network, and suggest, estimate, or otherwise recommend operations that can be executed to make said disparate data more meaningful, insightful, and readily ingestible or accessible by other computing systems or applications for further processing or analysis. There is therefore a need to develop a digital assistant that can recommend operations based on data relationships in order to eliminate or otherwise minimize time constraints associated with computing operations within the multi-application network. Furthermore, the cost in terms of time, accuracy, and user experience (e.g., navigating multiple similar or dissimilar tools/interfaces) associated with data analysis can affect productivity and/or workflow efficiency, computational or otherwise, within the multi-application network.

Figure 1:
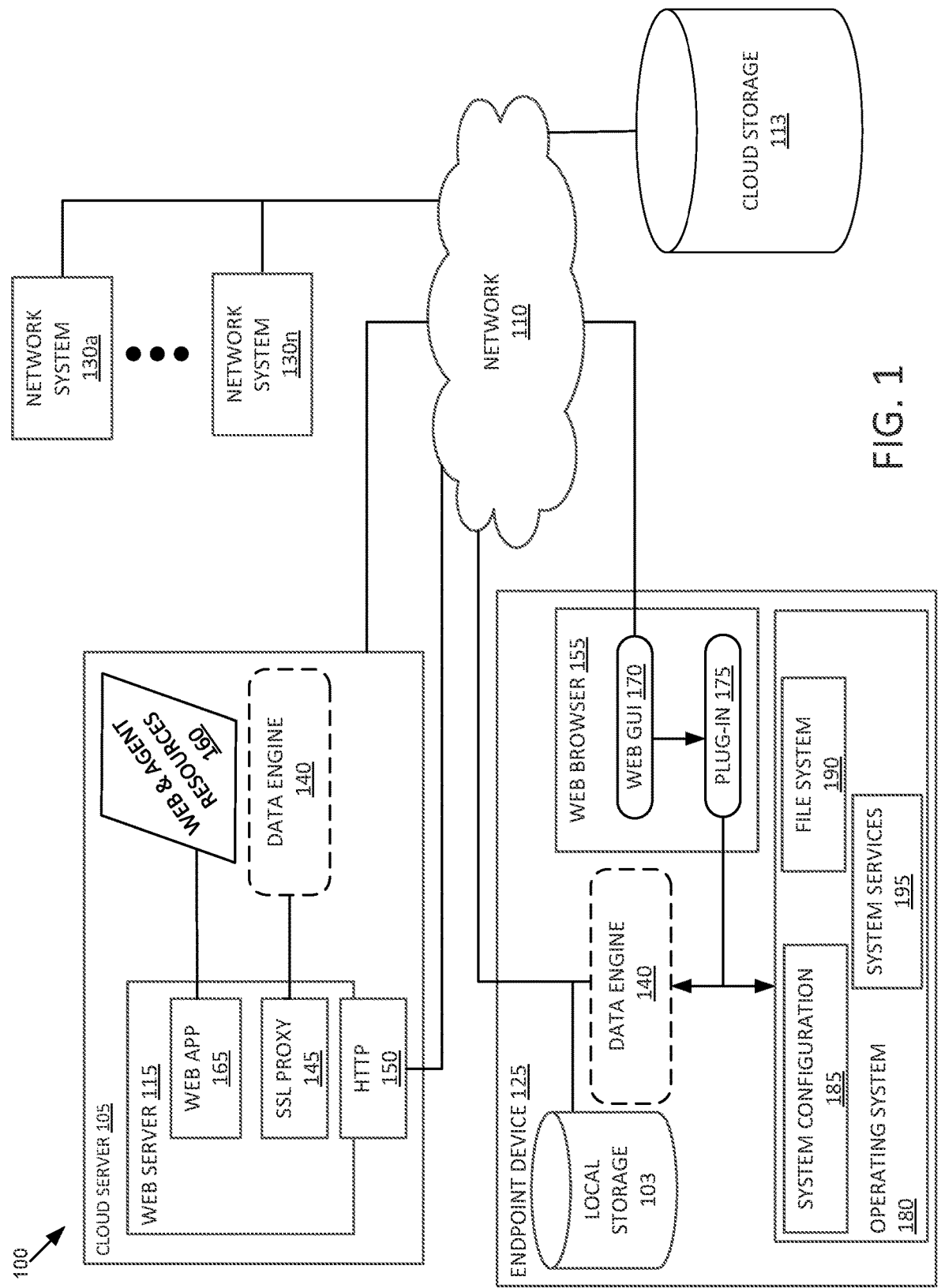
FIG. 1 is a high level diagram of an exemplary system indicting an implementation of a multi-application network, in accordance with some embodiments of this disclosure.

Illustrated in FIG. 1 is a high level diagram of an exemplary system 100 indicting an implementation of a multi-application network. In the illustrated implementation, the system 100 may include a cloud server 105 communicatively coupled to a plurality of network systems 130*a* . . . 130*n* via a network 110. The system 100 may also include an endpoint device 125 and cloud storage 113 communicatively coupled via the network 110. While a single cloud server 105 and a single endpoint device 125 are illustrated, the disclosed principles and techniques could be expanded to include multiple cloud servers, multiple endpoints, and multiple cloud storage devices.

In some embodiments, the cloud server 105 may include a computing device such as a mainframe server, a content server, a communication server, a laptop computer, a desktop computer, a handheld computing device, a smart phone, a wearable computing device, a tablet computing device, a virtual machine, a mobile computing device, a cloud-based computing solution and/or a cloud-based service, and/or the like. The cloud server 105 may include a plurality of computing devices configured to communicate with one another and/or implement the techniques described herein.

Figure 2:
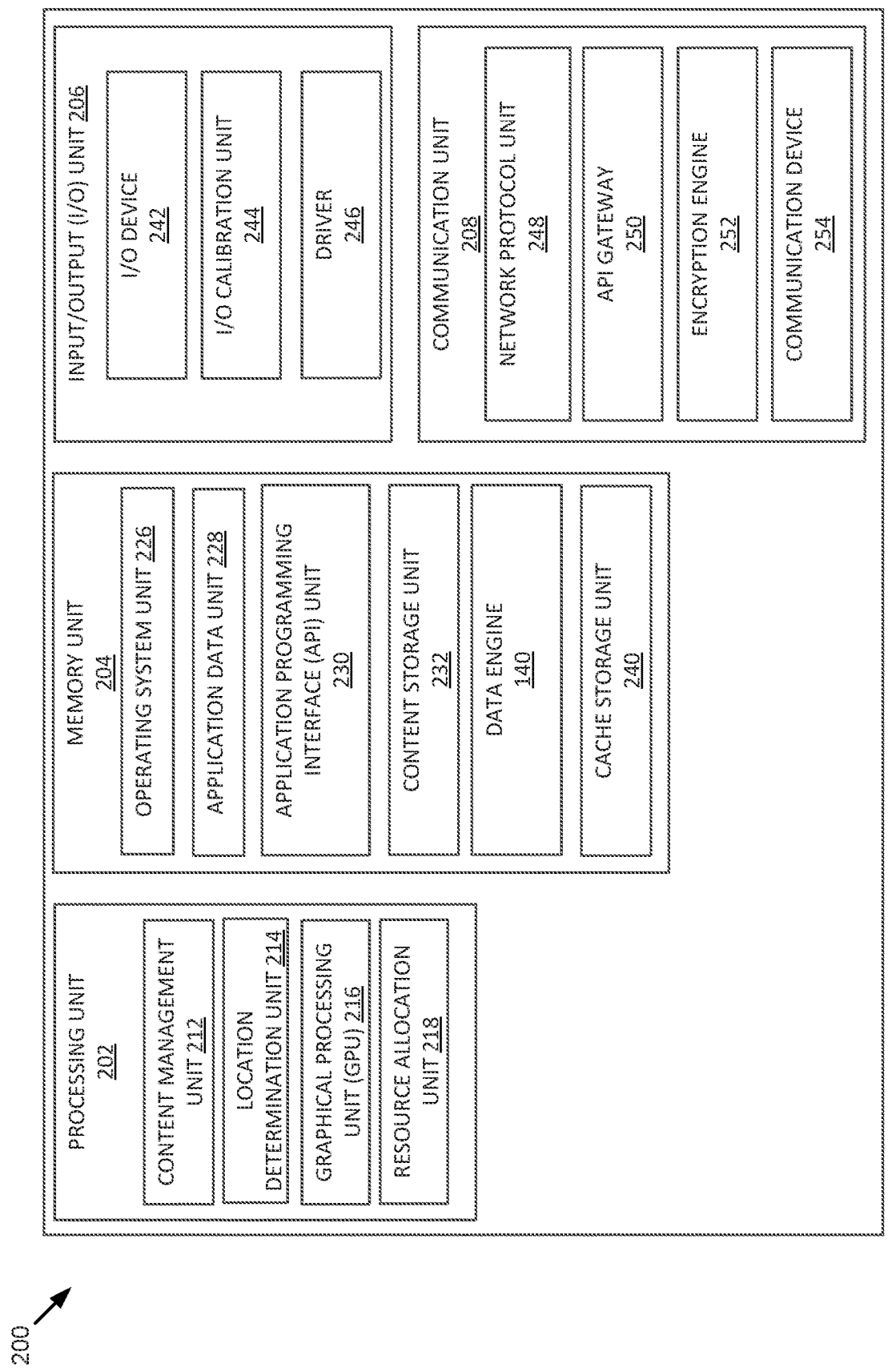
FIGS. 2 and 3 illustrate exemplary functional and system diagrams, respectively, of a computing environment for implementing a digital assistant in a multi-application network.
Figure 3:
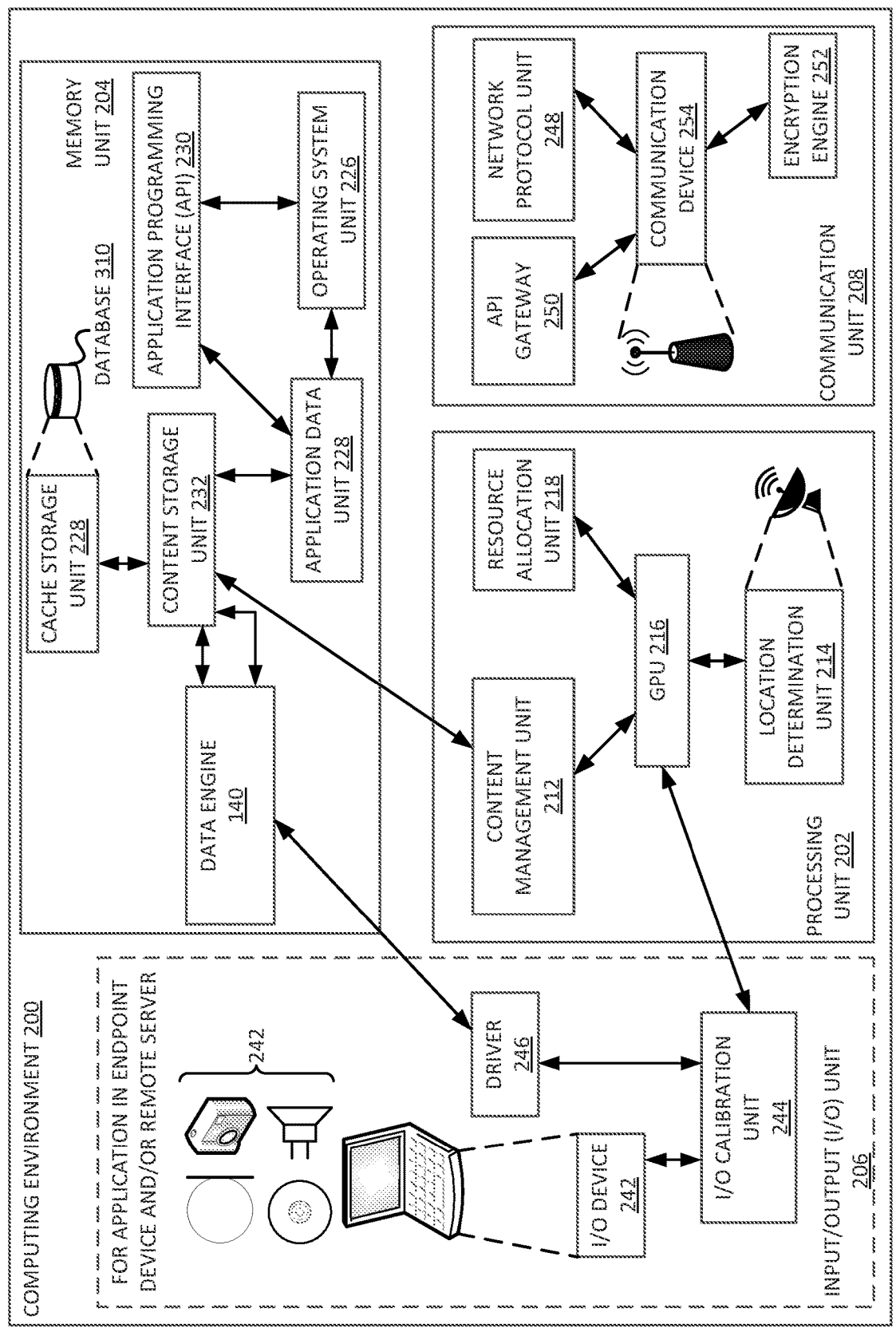

The cloud server 105 may include various elements of a computing environment as described in association with the computing environment 200 of FIGS. 2 and 3. For example, the cloud server 105 may include processing unit 202, a memory unit 204, an input/output (I/O) unit 206, and/or a communication unit 208 which are discussed in association with FIGS. 2 and 3. The cloud server 105 may further include subunits and/or other modules for performing operations associated with implementing a digital assistant in a multi-application network, registering a digital command in a multi-application network, generating dynamic context data associated with a digital request data object in a multi-application network, curating data associated with a multi-application network, and generating one or more digital records indicating computing operations and state data within a multi-application network. The cloud server may be locally or remotely operated as the case may require.

Turning back to FIG. 1, the cloud server 105 may include a web server 115, a data engine 140, and a web and agent resources 160. The web server 115, the data engine 140 and the web and agent resources 160 may be coupled to each other and to the network 110 via one or more signal lines. The one or more signal lines may comprise wired and/or wireless connections.

The web server 115 may include a secure socket layer (SSL) proxy 145 for establishing HTTP-based connectivity 150 between the cloud server 105 and other devices or systems coupled to the network 110. Other forms of secure connection techniques, such as encryption, may be employed on the web server 115 and across other systems coupled to the network 110. Additionally, the web server 115 may deliver artifacts (e.g., binary code, instructions, data, etc.) to the data engine 140 either directly via the SSL proxy 145 and/or via the network 110. Additionally, the web and agent resources 160 of the cloud server 105 may be provided to the endpoint device 125 via the web app 165 on the web server 115. The web and agent resources 160 may be used to render a web-based graphical interface (GUI) 170 via the browser 155 running on the endpoint device 125.

The data engine 140 may either be implemented on the cloud server 105 and/or on the endpoint device 125. The data engine 140 may include one or more instructions or computer logic that are executed by the one or more processors such as processors such as the processors discussed in association with FIGS. 2 and 3. In particular, the data engine facilitates executing the processing procedures, methods, techniques, and workflows provided in this disclosure. Some embodiments include an iterative refinement of one or more data models (e.g., learning model, large language model)

associated with the multi-application network disclosed via feedback loops executed by one or more computing device processors and/or through other control devices or mechanisms that make determinations regarding optimization of a given action, template, or model.

In some embodiments, the data engine 140 may access an operating system 180 of the endpoint device 125 in order to execute the disclosed techniques on the endpoint device 125. For instance, the data engine 140 may gain access into the operating system 180 including the system configuration module 185, the file system 190, and the system services module 195 in order to execute computing operations associated with implementing a digital assistant in a multi-application network, registering a digital command in a multi-application network, generating dynamic context data associated with a digital request data object in a multi-application network, curating data associated with a multi-application network, and generating one or more digital records indicating computing operations and state data within a multi-application network. The plug-in 175 of the web browser 155 may provide needed downloads that facilitate operations executed by the operating system 180, the data engine 140, and/or other applications running on the endpoint device 125.

The network 110 may include a plurality of networks. For instance, the network 110 may include any wired and/or wireless communication network that facilitates communication between the cloud server 105, the cloud storage 113, and the endpoint device 125. The network 110, in some instances, may include an Ethernet network, a cellular network, a computer network, the Internet, a wireless fidelity (Wi-Fi) network, a light fidelity (Li-Fi) network, a Bluetooth network, a radio frequency identification (RFID) network, a near-field communication (NFC) network, a laser-based network, a 5G network, and/or the like.

The network systems 130a . . . 130n may include one or more computing devices or servers, services, or applications the can be accessed by the cloud server 105 and/or the endpoint device 125 and or the cloud database 113 via the network 110. In one embodiment, the network systems 130a . . . 130n comprises third-party applications or services that are native or non-native to either the cloud server 105 and/or the endpoint device 125. The third-party applications or services, for example, may facilitate executing one or more computing operations associated with resolving an exception event associated with a digital request data object. As further discussed below, the digital request data object may comprise a document or a file outlining one or more of: account data associated with a client request; or parametric data associated with resolving one or more exception events associated with the digital request data object. According to some implementations, the applications or services associated with the network systems 130a . . . 130n and/or associated with the cloud server 105, and/or the endpoint device 125 must be registered to activate or otherwise enable their usage in the multi-application network. In such cases, the applications and/or services may be encapsulated in a registration object such that the registration object is enabled or activated for use by the data engine 140 based on one or more of: context data associated with a first user input; device profile data associated with a first interface through which the first user input was received; and user profile data associated with the user providing the first user input. On the flip side, the applications and/or services may be encapsulated in a registration object such that the registration object is deactivated or blocked from usage by data engine 140 based on one or more of: context data associated with a second user input; context data associated with a second input; device profile data associated with a second interface through which the second input was received; and user profile data associated with a user providing the second input. The first and second user inputs may both be textual or auditory and may comprise a natural language input.

Returning to FIG. 1, the cloud storage 113 may comprise one or more storage devices that store data, information and instructions used by the cloud server 105 and/or the endpoint device 125. The stored information may include information about users, information about data models (e.g., learning model, an artificial intelligence model, etc.), information about a digital assistant associated with the multi-application network, information associated with a digital request data object, information about analysis operations executed by the data engine 140, etc. In one embodiment, the one or more storage devices mentioned above in association with the cloud storage 113 can be non-volatile memory or similar permanent storage device and media. For example, the one or more storage devices may include a hard disk drive, a CD-ROM device, a DVD-ROM device, a DVD-RAM device, a DVD-RW device, a flash memory device, solid state media, or some other mass storage device known in the art for storing information on a more permanent basis. While the cloud storage 113 is shown as being coupled to the cloud server 105 and the endpoint device 125 via the network 110, the data in the cloud storage 113 may be replicated, in some embodiments, on the cloud server 105 and/or the endpoint device 125. That is to say that a local copy of the data in the cloud storage 113 may be stored on the cloud server 105 and/or the endpoint device 125. This local copy may be synched with the cloud storage 113 so that when there are any changes to the information in the cloud storage 113, the local copy on either the cloud server 105 or the endpoint device 125 is also similarly updated or synched in real-time or in near-real-time to be consistent with the information in the cloud storage 113 and vice versa.

Turning back to FIG. 1, the endpoint device 125 may be a handheld computing device, a smart phone, a tablet, a laptop computer, a desktop computer, a personal digital assistant (PDA), a smart device, a wearable device, a biometric device, a computer server, a virtual server, a virtual machine, a mobile device, and/or a communication server. In some embodiments, the endpoint device 125 may include a plurality of computing devices configured to communicate with one another and/or implement the techniques described in this disclosure. It is appreciated that according to some implementations, the endpoint device may be used by a user to access a digital assistant associated with the multi-application network for executing a plurality of operations associated with digital request data object. The data engine 140 may use the assistant to communicate with the user and to execute a plurality of analysis operations as further discussed below.

The local storage 103, shown in association with the endpoint device 125, may include one or more storage devices that store data, information, and instructions used by the endpoint device 125 and/or other devices coupled to the network 110. The stored information may include various logs/records or event files (e.g., exception event data associated with a digital request data object), security event data, etc. The one or more storage devices discussed above in association with the local database 103 can be non-volatile memory or similar permanent storage device and media. For example, the one or more storage devices may include a hard disk drive, a floppy disk drive, a CD-ROM device, a DVD-ROM device, a DVD-RAM device, a DVD-RW device, a flash memory device, solid state media, or some other mass storage device known in the art for storing information on a more permanent basis.

The other elements of the endpoint device 125 are discussed in association with the computing environment 200 of FIGS. 2 and 3. For example, elements such as a processing unit 202, a memory unit 204, an input/output (I/O) unit 206, and/or a communication unit 208 may execute one or more of the modules of endpoint device 125 and/or one or more elements of the cloud server 105 shown in FIG. 1. The endpoint device 125 may also include subunits and/or other computing instances as provided in this disclosure for performing operations associated with digital request data object and/or the multi-application network.

FIGS. 2 and 3 illustrate exemplary functional and system diagrams of a computing environment 200, according to some embodiments of this disclosure, for implementing a digital assistant in a multi-application network, registering a digital command in a multi-application network, generating dynamic context data associated with a digital request data object in a multi-application network, curating data associated with a multi-application network, and generating one or more digital records indicating computing operations and state data within a multi-application network. Specifically, FIG. 2 provides a functional block diagram of the computing environment 200, whereas FIG. 3 provides a detailed system diagram of the computing environment 200.

As seen in FIGS. 2 and 3, the computing environment 200 may include a processing unit 202, a memory unit 204, an I/O unit 206, and a communication unit 208. The processing unit 202, the memory unit 204, the I/O unit 206, and the communication unit 208 may include one or more subunits for performing operations described in this disclosure. Additionally, each unit and/or subunit may be operatively and/or otherwise communicatively coupled with each other and to the network 110. The computing environment 200 may be implemented on general-purpose hardware and/or specifically-purposed hardware as the case may be. Importantly, the computing environment 200 and any units and/or subunits of FIGS. 2 and/or 3 may be included in one or more elements of system 100 as described in association with FIG. 1. For example, one or more elements (e.g., units and/or subunits) of the computing environment 200 may be included in the cloud server 105 and/or the endpoint device 125 and/or the network systems 130a . . . 130n.

The processing unit 202 may control one or more of the memory unit 204, the I/O unit 206, and the communication unit 208 of the computing environment 200, as well as any included subunits, elements, components, devices, and/or functions performed by the memory unit 204, I/O unit 206, and the communication unit 208. The described sub-elements of the computing environment 200 may also be included in similar fashion in any of the other units and/or devices included in the system 100 of FIG. 1. Additionally, any actions described herein as being performed by a processor may be taken by the processing unit 202 of FIGS. 2 and 3 alone and/or by the processing unit 202 in conjunction with one or more additional processors, units, subunits, elements, components, devices, and/or the like. Further, while one processing unit 202 may be shown in FIGS. 2 and 3, multiple processing units may be present and/or otherwise included in the computing environment 200 or elsewhere in the overall system (e.g., system 100 of FIG. 1). Thus, while instructions may be described as being executed by the processing unit 202 (and/or various subunits of the processing unit 202), the instructions may be executed simultaneously, serially, and/or otherwise by one or multiple processing units 202 on one or more devices.

In some embodiments, the processing unit 202 may be implemented as one or more computer processing unit (CPU) chips and/or graphical processing unit (GPU) chips and may include a hardware device capable of executing computer instructions. The processing unit 202 may execute instructions, codes, computer programs, and/or scripts. The instructions, codes, computer programs, and/or scripts may be received from and/or stored in the memory unit 204, the I/O unit 206, the communication unit 208, subunits, and/or elements of the aforementioned units, other devices, and/or computing environments, and/or the like.

In some embodiments, the processing unit 202 may include, among other elements, subunits such as a content management unit 212, a location determination unit 214, a graphical processing unit (GPU) 216, and a resource allocation unit 218. Each of the aforementioned subunits of the processing unit 202 may be communicatively and/or otherwise operably coupled with each other.

The content management unit 212 may facilitate generation, modification, analysis, transmission, and/or presentation of content. Content may be file content, exception event content, content associated with a digital request data object, content associated with a registration object (e.g., a registration data object associated with registering a command or an application for use by the digital assistant), media content, security event content, or any combination thereof. In some instances, content on which the content management unit 212 may operate includes device information, user interface data, image data, text data, themes, audio data or audio files, video data or video files, documents, and/or the like. Additionally, the content management unit 212 may control the audio-visual environment and/or appearance of application data during execution of various processes (e.g., via web GUI 170 at the endpoint device 125). In some embodiments, the content management unit 212 may interface with a third-party content server (e.g., third-party content server associated with the network systems 130a . . . 130n), and/or specific memory locations for execution of its operations.

The location determination unit 214 may facilitate detection, generation, modification, analysis, transmission, and/or presentation of location information. Location information may include global positioning system (GPS) coordinates, an internet protocol (IP) address, a media access control (MAC) address, geolocation information, a port number, a server number, a proxy name and/or number, device information (e.g., a serial number), an address, a zip code, and/or the like. In some embodiments, the location determination unit 214 may include various sensors, radar, and/or other specifically-purposed hardware elements for the location determination unit 214 to acquire, measure, and/or otherwise transform location information.

The GPU 216 may facilitate generation, modification, analysis, processing, transmission, and/or presentation of content described above, as well as any data described herein. In some embodiments, the GPU 216 may be utilized to render content for presentation on a computing device (e.g., via web GUI 170 at the endpoint device 125). The GPU 216 may also include multiple GPUs and therefore may be configured to perform and/or execute multiple processes in parallel.

The resource allocation unit 218 may facilitate the determination, monitoring, analysis, and/or allocation of computing resources throughout the computing environment 200 and/or other computing environments. For example, the computing environment may facilitate a high volume of data (e.g., data associated with a digital request data object or a registration object), to be processed and analyzed. As such, computing resources of the computing environment 200 used by the processing unit 202, the memory unit 204, the I/O unit 206, and/or the communication unit 208 (and/or any subunit of the aforementioned units) such as processing power, data storage space, network bandwidth, and/or the like may be in high demand at various times during operation. Accordingly, the resource allocation unit 218 may include sensors and/or other specially-purposed hardware for monitoring performance of each unit and/or subunit of the computing environment 200, as well as hardware for responding to the computing resource needs of each unit and/or subunit. In some embodiments, the resource allocation unit 218 may use computing resources of a second computing environment separate and distinct from the computing environment 200 to facilitate a desired operation. For example, the resource allocation unit 218 may determine a number of simultaneous computing processes and/or requests. The resource allocation unit 218 may also determine that the number of simultaneous computing processes and/or requests meet and/or exceed a predetermined threshold value. Based on this determination, the resource allocation unit 218 may determine an amount of additional computing resources (e.g., processing power, storage space of a particular non-transitory computer-readable memory medium, network bandwidth, and/or the like) required by the processing unit 202, the memory unit 204, the I/O unit 206, the communication unit 208, and/or any subunit of the aforementioned units for safe and efficient operation of the computing environment while supporting the number of simultaneous computing processes and/or requests. The resource allocation unit 218 may then retrieve, transmit, control, allocate, and/or otherwise distribute determined amount(s) of computing resources to each element (e.g., unit and/or subunit) of the computing environment 200 and/or another computing environment.

The memory unit 204 may be used for storing, recalling, receiving, transmitting, and/or accessing various files and/or data during operation of computing environment 200. For example, memory unit 204 may be used for storing, recalling, and/or updating exception event information as well as other data associated with, resulting from, and/or generated by any unit, or combination of units and/or subunits of the computing environment 200. In some embodiments, the memory unit 204 may store instructions, code, and/or data that may be executed by the processing unit 202. For instance, the memory unit 204 may store code that execute operations associated with one or more units and/or one or more subunits of the computing environment 200. For example, the memory unit may store code for the processing unit 202, the I/O unit 206, the communication unit 208, and for itself.

Memory unit 204 may include various types of data storage media such as solid state storage media, hard disk storage media, virtual storage media, and/or the like. Memory unit 204 may include dedicated hardware elements such as hard drives and/or servers, as well as software elements such as cloud-based storage drives. In some implementations, memory unit 204 may be a random access memory (RAM) device, a dynamic random access memory (DRAM) device, a static random access memory (SRAM) device, flash memory, read only memory (ROM) device, and/or various forms of secondary storage. The RAM device may be used to store volatile data and/or to store instructions that may be executed by the processing unit 202. For example, the instructions stored by the RAM device may be a command, a current operating state of computing environment 200, an intended operating state of computing environment 200, and/or the like. As a further example, data stored in the RAM device of memory unit 204 may include instructions related to various methods and/or functionalities described herein. The ROM device may be a non-volatile memory device that may have a smaller memory capacity than the memory capacity of a secondary storage. The ROM device may be used to store instructions and/or data that may be read during execution of computer instructions. In some embodiments, access to both the RAM device and ROM device may be faster to access than the secondary storage.

Secondary storage may comprise one or more disk drives and/or tape drives and may be used for non-volatile storage of data or as an over-flow data storage device if the RAM device is not large enough to hold all working data. Secondary storage may be used to store programs that may be loaded into the RAM device when such programs are selected for execution. In some embodiments, the memory unit 204 may include one or more databases 310 (shown in FIG. 3) for storing any data described herein. For example, depending on the implementation, the one or more databases may be used as the local record repository 103 of the endpoint device discussed with reference to FIG. 1. Additionally or alternatively, one or more secondary databases (e.g., the public record repository 113 discussed with reference to FIG. 1) located remotely from computing environment 200 may be used and/or accessed by memory unit 204. In some embodiments, memory unit 204 and/or its subunits may be local to the cloud server 105 and/or the endpoint device 125 and/or remotely located in relation to the cloud server 105 and/or the endpoint device 125.

Turning back to FIG. 2, the memory unit 204 may include subunits such as an operating system unit 226, an application data unit 228, an application programming interface (API) unit 230, a content storage unit 232, data engine 140, and a cache storage unit 240. Each of the aforementioned subunits of the memory unit 204 may be communicatively and/or otherwise operably coupled with each other and other units and/or subunits of the computing environment 200. It is also noted that the memory unit 204 may include other modules, instructions, or code that facilitate the execution of the techniques described. For instance, the memory unit 204 may include one or more modules such as a data engine discussed in association with FIG. 4.

The operating system unit 226 may facilitate deployment, storage, access, execution, and/or utilization of an operating system utilized by computing environment 200 and/or any other computing environment described herein. In some embodiments, operating system unit 226 may include various hardware and/or software elements that serve as a structural framework for processing unit 202 to execute various operations described herein. Operating system unit 226 may further store various pieces of information and/or data associated with the operation of the operating system and/or computing environment 200 as a whole, such as a status of computing resources (e.g., processing power, memory availability, resource utilization, and/or the like), runtime information, modules to direct execution of operations described herein, user permissions, security credentials, and/or the like.

The application data unit 228 may facilitate deployment, storage, access, execution, and/or utilization of an application used by computing environment 200 and/or any other computing environment described herein. For example, the endpoint device 125 may be required to download, install, access, and/or otherwise use a software application (e.g., web application 165) to facilitate implementing a digital assistant in a multi-application network, registering a digital command in a multi-application network, generating dynamic context data associated with a digital request data object in a multi-application network, curating data associated with a multi-application network, and generating one or more digital records indicating computing operations and state data within a multi-application network. As such, the application data unit 228 may store any information and/or data associated with an application. The application data unit 228 may further store various pieces of information and/or data associated with the operation of an application and/or computing environment 200 as a whole, such as status of computing resources (e.g., processing power, memory availability, resource utilization, and/or the like), runtime information, user interfaces, modules to direct execution of operations described herein, user permissions, security credentials, and/or the like.

The API unit 230 may facilitate deployment, storage, access, execution, and/or utilization of information associated with APIs of computing environment 200 and/or any other computing environment described herein. For example, computing environment 200 may include one or more APIs for various devices, applications, units, subunits, elements, and/or other computing environments to communicate with each other and/or utilize the same data. Accordingly, API unit 230 may include API databases containing information that may be accessed and/or utilized by applications, units, subunits, elements, and/or operating systems of other devices and/or computing environments. In some embodiments, each API database may be associated with a customized physical circuit included in memory unit 204 and/or API unit 230. Additionally, each API database may be public and/or private, and so authentication credentials may be required to access information in an API database. In some embodiments, the API unit 230 may enable the cloud server 105 and the endpoint device 125 to communicate with each other. It is appreciated that the API unit 230 may facilitate accessing, using the data engine 140, one or more applications or services on the cloud server 105 and/or the network systems 130a . . . 130n.

The content storage unit 232 may facilitate deployment, storage, access, and/or utilization of information associated with performance of implementing operations associated with a multi-application network and/or framework processes by computing environment 200 and/or any other computing environment described herein. In some embodiments, content storage unit 232 may communicate with content management unit 212 to receive and/or transmit content files (e.g., media content, digital request data object content, command content, input content, registration object content, etc.).

As previously discussed, the data engine 140 facilitates executing the processing procedures, methods, techniques, and workflows provided in this disclosure. In particular, the data engine 140 may be configured to execute computing operations associated with the disclosed methods, systems/apparatuses, and computer program products.

The cache storage unit 240 may facilitate short-term deployment, storage, access, analysis, and/or utilization of data. In some embodiments, cache storage unit 240 may serve as a short-term storage location for data so that the data stored in cache storage unit 240 may be accessed quickly. In some instances, cache storage unit 240 may include RAM devices and/or other storage media types for quick recall of stored data. Cache storage unit 240 may include a partitioned portion of storage media included in memory unit 204.

The I/O unit 206 may include hardware and/or software elements for the computing environment 200 to receive, transmit, and/or present information useful for performing the disclosed processes. For example, elements of the I/O unit 206 may be used to receive input from a user of the endpoint device 125. As described herein, I/O unit 206 may include subunits such as an I/O device 242, an I/O calibration unit 244, and/or driver 246.

The I/O device 242 may facilitate the receipt, transmission, processing, presentation, display, input, and/or output of information as a result of executed processes described herein. In some embodiments, the I/O device 242 may include a plurality of I/O devices. In some embodiments, I/O device 242 may include a variety of elements that enable a user to interface with computing environment 200. For example, I/O device 242 may include a keyboard, a touchscreen, a button, a sensor, a biometric scanner, a laser, a microphone, a camera, and/or another element for receiving and/or collecting input from a user. Additionally and/or alternatively, I/O device 242 may include a display, a screen, a sensor, a vibration mechanism, a light emitting diode (LED), a speaker, a radio frequency identification (RFID) scanner, and/or another element for presenting and/or otherwise outputting data to a user. In some embodiments, the I/O device 242 may communicate with one or more elements of processing unit 202 and/or memory unit 204 to execute operations associated with the disclosed techniques and systems.

The I/O calibration unit 244 may facilitate the calibration of the I/O device 242. For example, I/O calibration unit 244 may detect and/or determine one or more settings of I/O device 242, and then adjust and/or modify settings so that the I/O device 242 may operate more efficiently. In some embodiments, I/O calibration unit 244 may use a driver 246 (or multiple drivers) to calibrate I/O device 242. For example, the driver 246 may include software that is to be installed by I/O calibration unit 244 so that an element of computing environment 200 (or an element of another computing environment) may recognize and/or integrate with I/O device 242 for the processes described herein.

The communication unit 208 may facilitate establishment, maintenance, monitoring, and/or termination of communications between computing environment 200 and other computing environments, third party server systems, and/or the like (e.g., between the cloud server 105 and the endpoint device 125 and or the network systems 130a . . . 130n). Communication unit 208 may also facilitate internal communications between various elements (e.g., units and/or subunits) of computing environment 200. In some embodiments, communication unit 208 may include a network protocol unit 248, an API gateway 250, an encryption engine 252, and/or a communication device 254. Communication unit 208 may include hardware and/or other software elements.

The network protocol unit 248 may facilitate establishment, maintenance, and/or termination of a communication connection for computing environment 200 by way of a network. For example, the network protocol unit 248 may detect and/or define a communication protocol required by a particular network and/or network type. Communication protocols used by the network protocol unit 248 may include Wi-Fi protocols, Li-Fi protocols, cellular data network protocols, Bluetooth® protocols, WiMAX protocols, Ethernet protocols, powerline communication (PLC) protocols, and/ or the like. In some embodiments, facilitation of communication for computing environment 200 may include transforming and/or translating data from being compatible with a first communication protocol to being compatible with a second communication protocol. In some embodiments, the network protocol unit 248 may determine and/or monitor an amount of data traffic to consequently determine which particular network protocol is to be used for establishing a secure communication connection, transmitting data, and/or performing malware scanning operations and/or other processes described herein.

The API gateway 250 may allow other devices and/or computing environments to access the API unit 230 of the memory unit 204 associated with the computing environment 200. For example, an endpoint device 125 may access the API unit 230 of the computing environment 200 via the API gateway 250. In some embodiments, the API gateway 250 may be required to validate user credentials associated with a user of the endpoint device 125 prior to providing access to the API unit 230 to a user. The API gateway 250 may include instructions for the computing environment 200 to communicate with another computing device and/or between elements of the computing environment 200.

Exemplary Embodiment

Processing or analyzing data in a multi-application network may involve the use of a plurality of technologies or applications associated one or more domains, sectors, processing stages, and/or workflow stages or sub-stages associated with a digital request data object. According to one embodiment, the digital request data object comprises a file, or a document, or a record, or profile data associated with a user request, or profile data associated with a digital service comprised in or associated with the multi-application network. It is appreciated that the file, the document, record, profile data associated with a user request, or profile data associated with a service comprised in, or associated with the multi-application network outlines or is associated with one or more of: account data associated with the digital request data object; or parametric data associated with resolving one or more exception events associated with the digital request data object. According to one embodiment, the multi-application network may: connect a plurality of users via one or more computer networks such as those discussed above in association with FIGS. 1, 2, and 3; include computational capabilities that improve user experience; include one or more analysis operations comprising workflows/logic associated with one or more applications; and include a machine learning or an artificial intelligence engine or module drives context identification associated with a digital request data object and allows further customized interrogation of the multi-application network based on identified context. In some embodiments, the disclosed multi-application network is scalable, and can condense multiple user interfaces into a single user interface based on the digital context associated with a given digital request data object to allow optimized and otherwise seamless generation of analysis data or computing results associated with the processing stages associated with the digital request data object. Moreover, the analysis data, computing results, or context or intent data associated with the digital request data object may be displayed on a single interface thereby negating the laborious process of a user navigating between a plurality of applications and/or interfaces associated with a plurality of applications generating the analysis data, computing results, or context data. This may be achieved by the user interacting with a digital assistant of the multi-application network such that the digital assistant automatically evaluates user inputs (e.g., textual or audio natural language inputs) and intelligently engages applications associated with the multi-application network to execute the needed process for the various processing stages associated with resolving one or more exception events associated with the digital request data object. For example, the digital assistant may comprise or be associated with an artificial or machine learning engine which adapts to, or intelligently uses the user inputs by leveraging context data associated with one or more of: a user profile; the user inputs; one or more digital request data objects; or an exception event associated with the one or more digital request data objects.

The exception event, for example, may comprise a disruption in processing a digital request data object at a particular processing stage based on the digital request data object's failure to meet certain requirements or criteria at said stage. For example, some of the requirements may include: a lack of additional input from a user associated with the digital request data object; profile data of the user associated with the digital request data object; a lack of analysis data or computing results data from other applications associated with the multi-application network; a time threshold required to process the digital request data object; profile data associated with a device on which the digital request data object is being processed; credential data associated with a user of the multi-application network; lack of context data associated with the digital request data object; lack of client profile data associated with a client corresponding to the digital request data object.

According to one embodiment, the multi-application network provides users with a functionality to operate on one or more requests (e.g., digital requests data objects) regardless of the status (e.g., exception event status) of said requests in a user-friendly and context-enabled machine learning user interface. The multi-application network can provide a user with relevant data based on a digital context within which the user is interacting or communicating with the digital assistant of the multi-application network. In one embodiment, the multi-application network can generate a context-specific interface based on the type of inquiry or operations associated with inputs being received so that a user does not need to actively navigate to multiple user interfaces or access relevant data processing applications that interpret or otherwise analyze data at a given processing stage of a digital request data object. In some embodiments, an application programming interface (API) such as those discussed in conjunction with FIGS. 2 and 3 facilitates the selection of relevant programs or digital logic for processing data associated with the digital request data object based on the digital context.

According to some embodiments, the multi-application network enables automating exception event detection associated with one or more digital request data objects with little to no user intervention using APIs that access and process stage-specific or domain-specific applications associated with the digital request data object. Results from such processes may be presented together with one or more recommendations on possible operations or workflows to execute to resolve and or track an identified exception on a single graphical user interface associated with the multi-application network. According to one embodiment, an identified exception of the digital request data object indicates a digital event, a digital disruption, a data anomaly, or data condition that needs to be resolved or satisfied for a stage-wise progression of the digital request data object, for example, to move the digital request data object to a different processing stage associated with the digital request data object. In one embodiment, the multi-application network can improve efficiency of operations, computing or otherwise, within the multi-application network by decreasing:

1) the cognitive load for teams (e.g., Agile team) using the multi-application network,
2) back-office (full-time equivalent FTE) operations associated with the multi-application network by at least 25% and,
3) user training time associated with the multi-application network by at least half of the time required to train users without the multi-application network.

Furthermore, the multi-application network can increase cross-domain data fungibility or cross-specialty data fungibility or cross-stage data fungibility associated with the digital request data object.

The disclosed technology beneficially provides a broad set of functionalities by developing, delivering, and releasing distributed and stand-alone solutions for inter-domain, inter-stage data management through the use of a single multi-application network. Furthermore, the disclosed methods and systems provide a conversational architecture to facilitate interactions between a user and the multi-application network using a digital assistant. In particular, the multi-application network can receive natural language queries/inputs associated with a digital request data object from a user, analyze said natural language queries and provide workflow recommendations as well as other responses associated said natural language queries. In some embodiments, the multi-application network can generate intent/context data indicating a digital context associated with the natural language queries and/or associated with a given digital request data object to generate one or more workflow recommendations and/or link a user query/input to one or more digital request data objects and/or applications. It is appreciated that the multi-application network can maintain a digital context associated with a given digital request data object based on one or more of a digital request of a client, a user input from a user, or a digital request data object associated with the user input. According to some embodiment, the multi-application network can curate data based on a profile of a user (e.g., a digital profile of a user), a digital profile of the digital request data object, a digital profile of a computing device being used by the user, location data of a user, and other security protocols associated with the user and/or the digital request data object. It is appreciated that the multi-application network may facilitate implementing a digital assistant, executing registration operations for digital commands, executing context awareness operations, executing operations associated with curating data, and executing operations associated with generating analysis reports or receipts responsive to executing one or more computing operations associated with a digital request data object and/or registration object associated with registering a command.

Digital Assistant

The digital assistant of the multi-application network may comprise a machine learning or an artificial intelligence engine module that can receive user input(s) (e.g., textual or auditory natural language inputs) associated with a digital request data object. Following reception of the user input(s), the digital assistant may infer or otherwise analyze said user inputs to generate intent or context data that provides a digital context associated with one or more of the user input taking into consideration the digital request data object associated with the user input, profile data associated with the user entering the user input, exception event data associated with the digital request data object, current or previously executed operations at one or more processing stages which have been executed on the digital request data object. In some embodiments, the digital assistant interacts with a user via a single user interface such as the one shown in FIG. 6. In particular, the digital assistant can beneficially facilitate seamlessly extracting and/or computationally operating on data associated with a digital request data object within the multi-application network based on context data thereby eliminating the need to process or analyze vast amounts of data that may not be contextually needful or pertinent to a given analysis at a given processing stage of the digital request data object. This advantageously improves user experience by eliminating the need for the user to interact with multiple interfaces and/or computational tools required to provide appropriate analysis data or computation results to the user.

In some embodiments, the digital assistant is implemented based on a microfrontend architecture that uses one or more user-inputs or commands in, for example, natural language to interpret user intent and thereby generate the intent or context data indicating the digital context. According to one embodiment, the context data may control, confirm, or otherwise regulate: the formatting and/or presentation of analysis operation recommendations based on the one or more user inputs; exception event detection and mitigation operations associated with the digital request data object; recommendation of stage-wise progression of operations that resolve exception events associated with the digital request data object; and communication with one or more APIs coupled to one or more native or non-native applications or other third-party applications that execute workflows based on one or more of a user input, a selected analysis operation recommendation, or the context data. In some embodiments, the digital assistant can match one or more keywords in a user input to one or more dynamically configured operations associated with a digital request data object to generate the one or more analysis operation recommendations for selection by the user. Furthermore, based on the context data, the digital assistant can suggest other tasks or data types to the user for selection as the case may require. If the digital assistant makes a suggestion that the user is not interested in, the user can provide other input commands (e.g., natural language input commands) clarifying the context data for the digital assistant to generate pertinent outputs for selection by the user. In such cases, the digital assistant is able to track and/or assimilate a trajectory of user inputs leading to an eventual recommendation selection by the user and at a later date, provide said recommendations for the same or other sets of user inputs associated with the same or different digital request data objects.

Exemplary Flowcharts

Figure 4A:
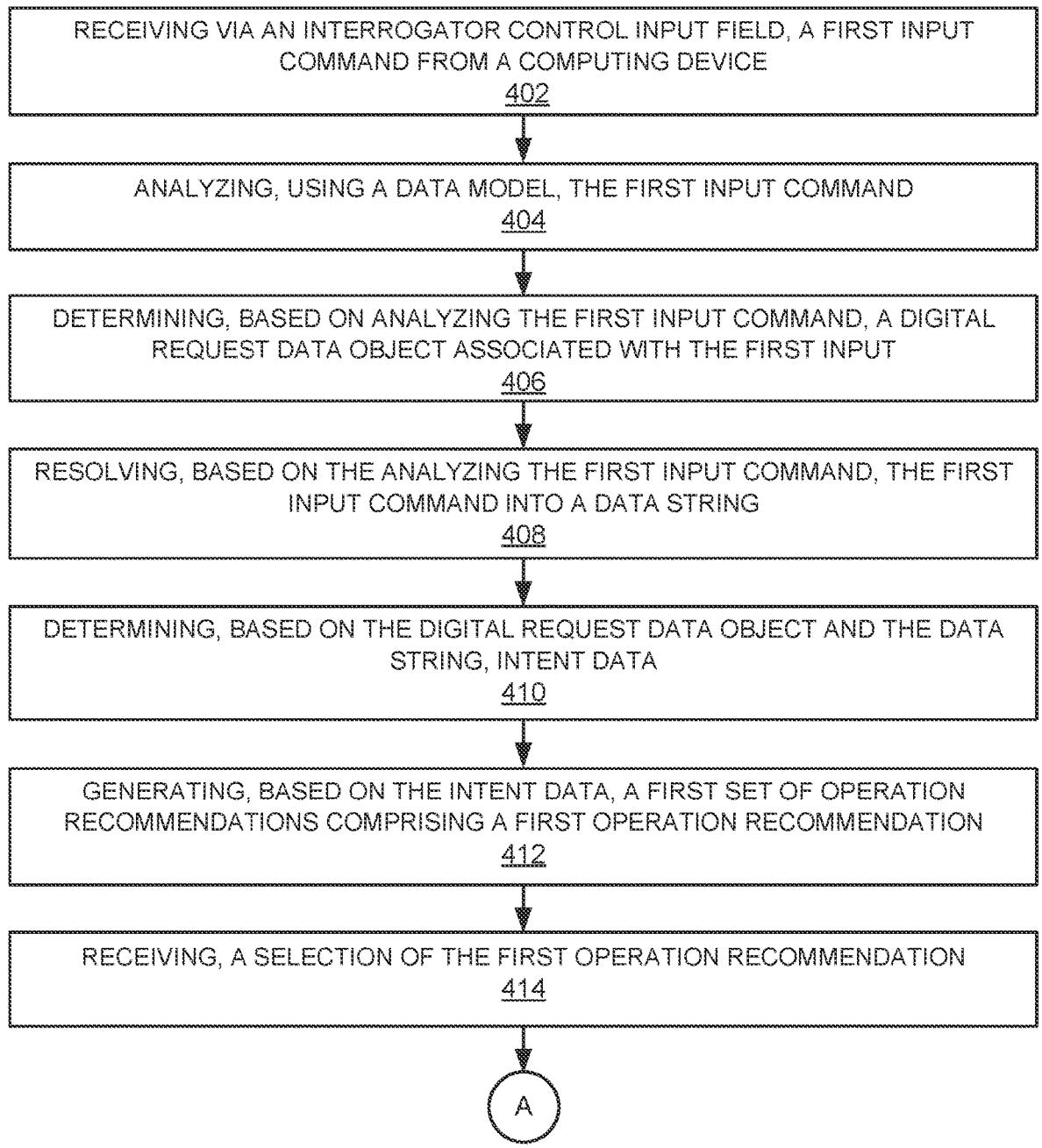
FIGS. 4A, 4B, and 5 show exemplary flowcharts for methods, systems/apparatuses, and computer program products that implement a digital assistant in a multi-application network such as the multi-application network of FIG. 1.
Figure 4B:
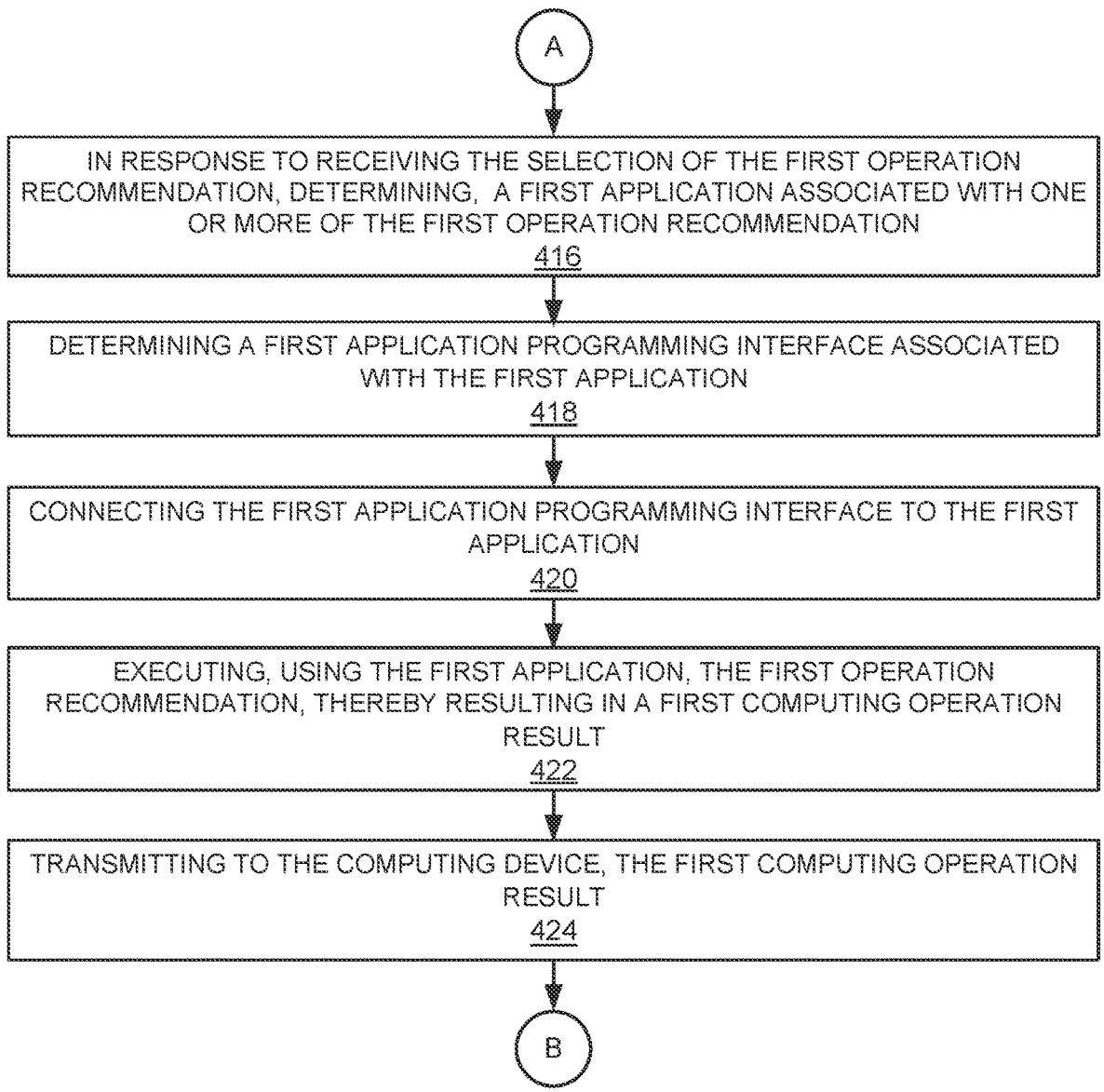
Figure 5:
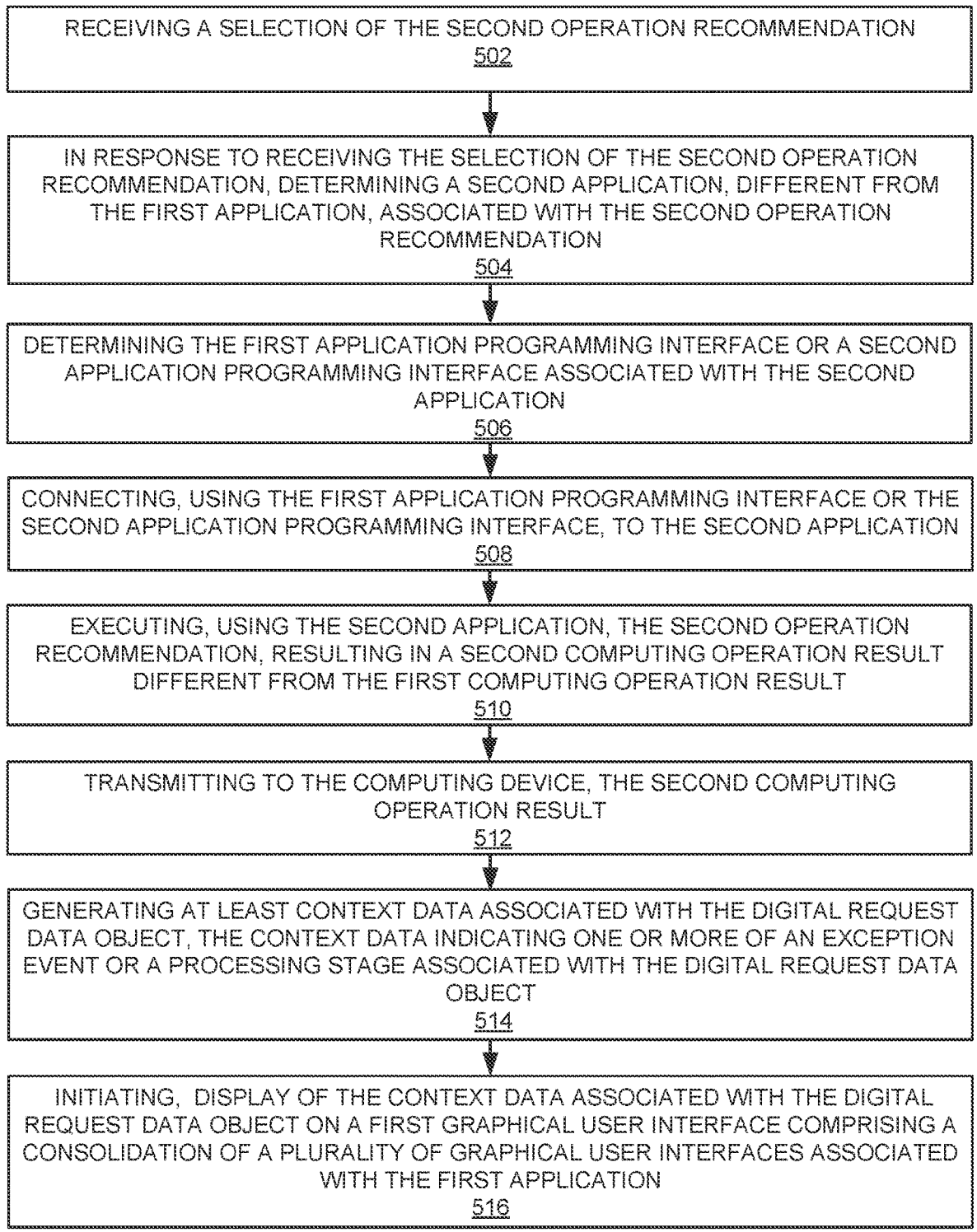

FIGS. 4A, 4B, and 5 show exemplary flowcharts for methods, systems/apparatuses, and computer program products that implement a digital assistant in a multi-application network such as the multi-application network of FIG. 1. It is appreciated that a data engine stored in a memory device (e.g., memory unit 204 of FIGS. 2 and 3) may cause a computer processor to execute the various processing stages of FIGS. 4A, 4B, and 5. At block 402, the data engine may receive via an interrogator control input field, a first input command from a computing device. According to some embodiments, the first input command comprises a natural language input. For example, the natural language input may include one or more textual or character string data associated with spoken and/or written language (e.g., English language, French language, Portuguese language, Chinese language, Japanese language, Korean language, Dutch language). At block 404, the data engine may analyze, using a data model, the first input command. In one embodiment, the data model comprises a large language model. The large language model, according to some embodiments, comprises an artificial intelligence (AI) or a machine learning model configured to process or otherwise analyze vast amounts of character strings associated with the spoken and/or written language. At block 406, the data engine may determine, based on analyzing the first input command, a digital request data object associated with the first input command. As discussed under the exemplary embodiments above, the digital request data object can comprise a file, or a document, or a record, or profile data associated with a user request (e.g., a digital request data object), or profile data associated with a digital service comprised in or associated with the multi-application network. The file, document, record, or profile data associated with the digital request data object, or profile data associated with a service comprised in, or associated with the multi-application network can outline or be associated with one or more of: account data associated with the digital request data object; or parametric data associated with resolving one or more exception events associated with the digital request data object. At block 408, the data engine may resolve, based on analyzing the first input command, the first input command into a data string (e.g., a character string, or one or more words, or one or more phrases). The data string may comprise textual data (e.g., string of characters) and/or vocal or auditory data defining or indicating a word, a phrase, or a sentence associated with written or spoken language (e.g., English language, French language, Portuguese language, Chinese language, Japanese language, Korean language, Dutch language). In one embodiment, the data string comprises a sequence of characters including letters, numbers, symbols, and blank spaces as the case may require. At block 410, the data engine may determine, based on the digital request data object and the data string, intent data. At block 412, the data engine can generate, based on the intent data, a first set of operation (e.g., computing operation) recommendations comprising a first operation recommendation. At block 414, the data engine can receive, a selection of the first operation recommendation. At block 416 of FIG. 4B, the data engine, in response to receiving the selection of the first operation recommendation, can determine a first application associated with the first operation recommendation and which is comprised in a collection of applications associated with the multi-application network. At block 418, the data engine can determine, a first application programming interface associated with the first application. At block 420, the data engine can connect, the first application programming interface, to the first application. At block 422, the data engine can execute, using the first application, the first operation recommendation, thereby resulting in a first computing operation result. At block 424, the data engine can transmit, to the computing device, the first computing operation result.

Turning to FIG. 5, the data engine may, at block 502, receive a selection of the second operation recommendation. At block 504, the data engine may, in response to receiving the selection of the second operation recommendation, determine a second application, different from the first application, associated with the second operation recommendation. At block 506, the data engine may determine the first application programming interface or a second application programming interface associated with the second application. The data engine may, at block 508, connect, using the first application programming interface or the second application programming interface, to the second application. The data engine, at block 510, may execute, using the second application, the second operation recommendation, thereby resulting in a second computing operation result different from the first computing operation result. The data engine may, at block 512, transmit to the computing device, the second computing operation result.

Continuing at block 514 of FIG. 5, the data engine may further generate at least context data (e.g., new or updated context data derived from the intent data) associated with the digital request data object or the first computing operation result based on, for example, the analysis of the first input command or a second input command or the selection of the first computing operation recommendation discussed in association with FIGS. 4A and 4B. In some embodiments, the context data indicates one or more of an exception event or a processing stage associated with the digital request data object. Furthermore, the data engine may initiate, at block 516, display of the context data and/or the first computing result associated with the digital request data object on a graphical user interface. The graphical user interface (e.g., a first graphical user interface) may comprise, for example, a consolidation of a plurality of graphical user interfaces associated with the first application or a plurality of applications associated with the first set of operation recommendations, or a condensation of a plurality of display elements associated with the first application or a plurality of applications associated with the first set of operation recommendations.

In one embodiment, the disclosed techniques may involve receiving a third input (e.g., natural language input), or a fourth input (e.g., natural language input), or a fifth input (e.g., natural language input) and analyze the third input, the fourth input, or the fifth input based on context data or an updated version of the context data associated with a previous first input or a previous second input to generate a third set of operation recommendations or a fourth set of operation recommendations that are displayable, using the digital assistant, on a graphical interface as identifiers (e.g., application identifiers) associated with one or more applications of the multi-application network. It is appreciated that the digital assistant disclosed leverages context data or updated context data associated with a digital request data object to enhance recommending computing operations associated with the digital request data object to a user. This beneficially negates the need to individually locate and/or access applications and/or interact with specific plurality of user interfaces associated with said applications to conduct analysis operations and/or other computing operations associated with the digital request data object.

These and other implementations may each optionally include one or more of the following features. The data engine, may be used, according to some embodiments, to automatically format one or more of: the first computing operation result for display on the first graphical user interface based on the context data (e.g., the new or updated context data); or a second set of operation recommendations having an associated second application that is generated based on the first operation recommendation or the context data (e.g., the new or updated context data). In one embodiment, the first graphical user interface is a single graphical user interface that is configured to display a plurality of analysis data including the first computing operation result. The plurality of analysis data may be generated from analysis operations associated with one or more digital request data objects including the determined digital request data object discussed above in association with block 406 of FIG. 4A. In addition, the analysis operations may be executed by one or more native (e.g., comprised in the multi-application network) or non-native (e.g., external to the multi-application network) applications associated with the multi-application network. In some embodiments, the plurality of analysis data or the context data may be displayed on the single graphical user interface instead of a plurality of graphical user interfaces associated with the one or more native or non-native applications associated with the multi-application network.

Furthermore, the data engine may be used to detect, using the context data, an exception event associated with the digital request data object. Based on detecting the exception event, the data engine may be used to generate a second set of operation recommendations indicating a stage-wise progression of operations that resolve the exception event. In one embodiment, the data engine may transmit the second set of operation recommendations for display on the first computing device. In some embodiments, the multi-application network is configured for multi-application or inter-domain or inter-stage data processing associated with: a plurality of domains and/or a plurality of stages associated with the digital request data object; or a plurality of domains comprised in a digital processing space using the first input command or a second input command as the case may require. In addition, the first application may comprise one of: an application native to the multi-application network; or an application that is not native to the multi-application network. In some embodiments, the parametric data referenced above in association with digital request data object comprises one or more identifier data associated with the digital request data object and/or quantitative data associated with the digital request data object and/or exception event data associated with the digital request data object. Furthermore, the data model may be configured to track or assimilate a trajectory of a plurality of input commands including the first input command leading to a selection of specific operation recommendations including the first operation recommendation. In one embodiment, the data model is an artificial intelligence language model or a machine learning language model that executes the tracking. Based on the tracking, the data model may be optimized and used by the data engine, via the digital assistant, to recommend a second set of operation recommendations for display on a graphical user interface associated with the first computing device or a second computing device. In one embodiment, the second set of operation recommendations comprise a second operation having an associated second application that executes the second operation recommendation via a second application programming interface to generate a second computing operation result.

Figure 6:
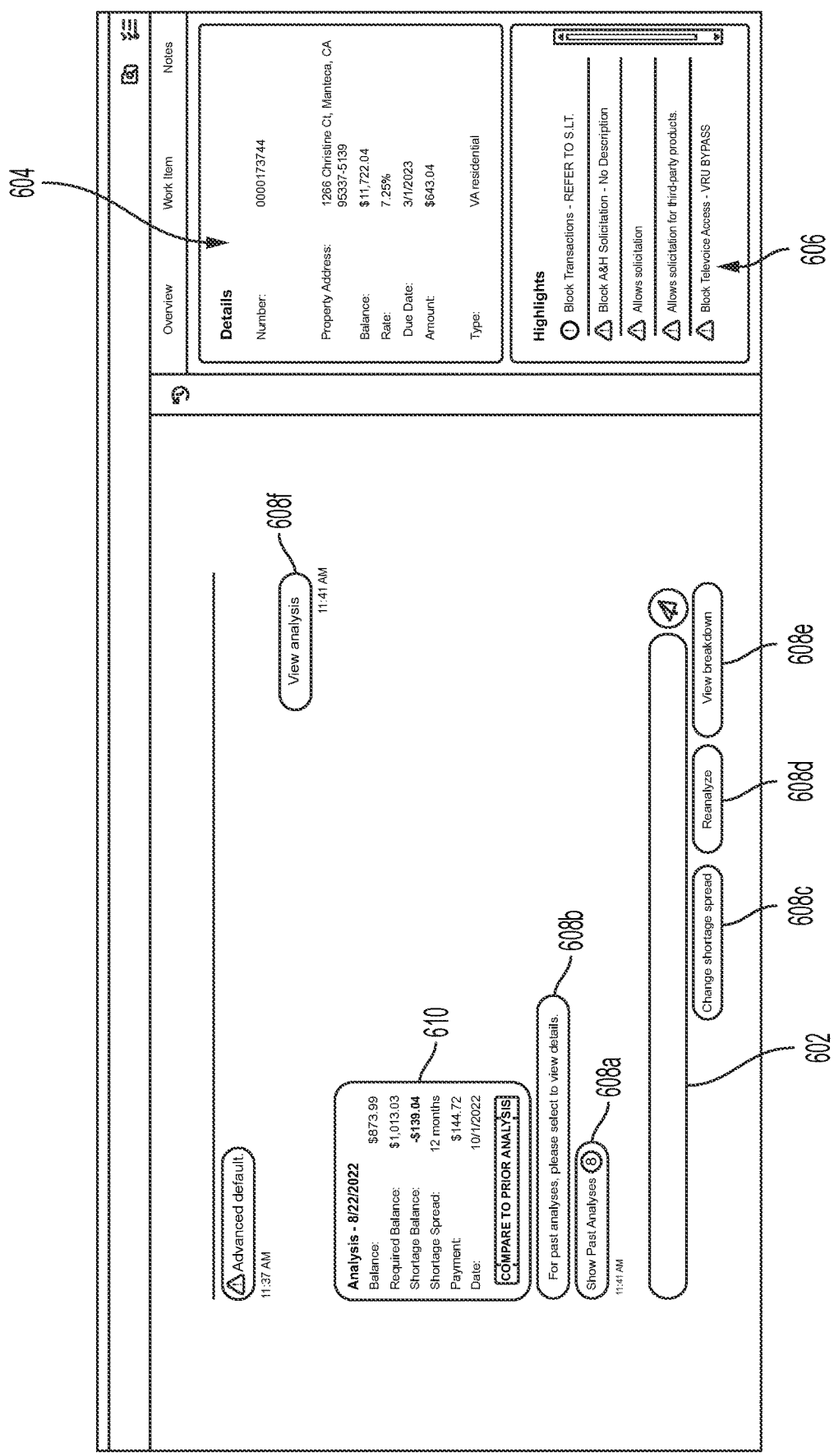
FIG. 6 shows an exemplary dynamic single interface associated with the digital assistant of the multi-application network.

FIG. 6 shows an exemplary single interface (e.g., dynamic single interface) associated with the digital assistant of the multi-application network. The single interface can, according to one embodiment, comprise an interrogator control input field 602 through which one or more textual or auditory inputs may be received. The textual and/or auditory input may comprise a natural language input from the user. In the case of a textual input, a keyboard, mouse, a touchscreen, or some other input device may facilitate the entry of the textual input. The auditory input on the other hand may be received using an input device such as a microphone. It is appreciated that the textual or auditory input can comprise one or more input commands from a user. After a command is received from a user via the interrogator control input field, the digital assistant can analyze, using an artificial intelligence or a machine learning language model, the input command to determine a digital request data object associated with the input command. In one embodiment, the initial input command comprises identifier data associated with the digital request data object. In other embodiments, the initial input command comprises metadata associated with the digital request data object. In yet other implementations, the initial input command comprises previously generated context data associated with the digital request data object. In any case the identifier data, the metadata, or the context data associated with the digital request data object informs or otherwise guides the digital assistant to retrieve, generate, or display a summary information 604 associated with the digital request data object. It is appreciated that the summary information 604 may include identifier or qualitative data associated with the digital request data object, quantitative data associated with the digital request data object, and/or exception event data associated with the digital request data object.

Furthermore, intent data or context data (e.g., previously generated intent or context data) associated with the digital request data object may also be displayed as shown under the highlights section 606 of the single user interface. According to one embodiment, the data presented under the highlights section 606 of the single user interface comprises a summary of the previously generated context data. Furthermore, the intent or context data may be organic in that it is dynamically updated based on one or more of: the types of computing operations to which the digital request data object is subjected to; a user profile of the user accessing the digital request data object; a device profile of the computing device through which the digital request data object is accessed; location data associated with the computing device through which the digital request data object is accessed; and processing stage data associated with resolving one or more exception events associated with the digital request data.

Turning back to FIG. 6, the digital assistant may generate and/or display, a set of computing operation recommendations 608a, 608b, 608c, 608d, 608e, 608f, etc., based on one or more of the intent or context data and/or parametric data or textual/vocal character data (e.g., specific input textual strings or vocal words) comprised in the input command. In one embodiment, the digital assistant may generate a computation result 610 based on a selection of at least one computing operation recommendation. To achieve this, the digital assistant may use one or more application programming interfaces, to connect, link, or otherwise activate a specific application required to execute the at least one computing operation. According to some embodiments, the digital assistant may generate additional sets of computing operation recommendations 608a . . . 608f in conjunction with generating and/or presenting the computing result 610. It is appreciated that the formatting of the computing result and/or the computing operation recommendations for display on the single graphical user interface may be based on the context data or an updated context data associated with the digital request data object.

It is appreciated that the digital request data object may comprise a file or document indicating a loan request, a request to process medical registration data, a request to process student data associated with an educational institution, a request to process scientific data associated with a research, etc.

This patent application incorporates by reference the following commonly owned applications, naming the same inventors, and filed on the same date as the present application (note that the list includes the present application): (1) U.S. patent application Ser. No. 18/373,771, titled "Methods And Systems For Implementing An Intelligent Digital Assistant In A Multi-Application Network," filed on Sep. 27, 2023; (2) U.S. Patent Application Ser. No. 18/373,797, titled "Methods And Systems For Registering A Digital Command In A Multi-Application Network," filed on Sep. 27, 2023; (3) U.S. Patent Application Ser. No. 18/373,813, titled "Methods And Systems For Generating Dynamic Context Data Associated With A Digital Request Data Object In A Multi-Application Network," filed on Sep. 27, 2023; (4) U.S. patent application Ser. No. 18/373,822, titled "Methods And Systems For Curating Data In A Multi-Application Network," filed on Sep. 27, 2023; and (5) U.S. patent application Ser. No. 18/373,830, titled "Methods And Systems For Generating Digital Records Indicating Computing Operations And State Data In A Multi-Application Network," filed on Sep. 27, 2023.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to explain the principles of the disclosed subject-matter and its practical applications, to thereby enable others skilled in the art to use the technology disclosed and various embodiments with various modifications as are suited to the particular use contemplated.

It is appreciated that the term optimize/optimal and its variants (e.g., efficient or optimally) may simply indicate improving, rather than the ultimate form of 'perfection' or the like.

Furthermore, the functions or operations described above can be implemented in digital electronic circuitry, in computer software, firmware or hardware. In particular, the disclosed techniques can be implemented using one or more computer program products. The computer program products, in some embodiments, comprises non-transitory computer-readable media comprising code configured to execute the disclosed approach. Programmable processors and computers can be included in or packaged as mobile devices according to some embodiments. The processes and logic flows can be performed by one or more programmable processors and by one or more programmable logic circuitry. General and special purpose computing devices and storage devices can be interconnected through communication networks.

It will also be understood that, although the terms first, second, etc., may be used herein to describe various elements, these elements should not be limited by these terms. These terms are used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description herein is for the purpose of describing particular embodiments and is not intended to be limiting. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combination of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context.

Those with skill in the art will appreciate that while some terms in this disclosure may refer to absolutes, e.g., all source receiver traces, each of a plurality of objects, etc., the methods and techniques disclosed herein may also be performed on fewer than all of a given thing, e.g., performed on one or more components and/or performed on one or more source receiver traces. Accordingly, in instances in the disclosure where an absolute is used, the disclosure may also be interpreted to be referring to a subset.

What is claimed is:

1. A method for implementing a digital assistant in a multi-application network, the method comprising:
   receiving, using one or more computing device processors, via an interrogator control input field, a first input command from a computing device;
   analyzing, using the one or more computing device processors, using a data model, the first input command;
   determining, using the one or more computing device processors, based on analyzing the first input command, a digital request data object associated with the first input command;
   resolving, using the one or more computing device processors and based on analyzing the first input command, the first input command into a data string;
   determining, using the one or more computing device processors, based on the digital request data object and the data string, intent data;
   generating, using the one or more computing device processors and based on the intent data, a first set of operation recommendations comprising a first operation recommendation and a second operation recommendation;
   receiving, using the one or more computing device processors, a selection of the first operation recommendation;
   in response to receiving the selection of the first operation recommendation, determining, using the one or more computing device processors, a first application associated with the first operation recommendation;
   determining, using the one or more computing device processors, a first application programming interface associated with the first application;
   connecting, using the one or more computing device processors and the first application programming interface, to the first application;
   executing, using the one or more computing device processors and the first application, the first operation recommendation, thereby resulting in a first computing operation result;
   transmitting, using the one or more computing device processors, to the computing device, the first computing operation result;

receiving, using the one or more computing device processors, a selection of the second operation recommendation;

in response to receiving the selection of the second operation recommendation, determining, using the one or more computing device processors, a second application, different from the first application, associated with the second operation recommendation;

determining, using the one or more computing device processors, the first application programming interface or a second application programming interface associated with the second application;

connecting, using the one or more computing device processors and the first application programming interface or the second application programming interface, to the second application;

executing, using the one or more computing device processors and the second application, the second operation recommendation, thereby resulting in a second computing operation result different from the first computing operation result;

transmitting, using the one or more computing device processors, to the computing device, the second computing operation result;

detecting, using context data, an exception event associated with the digital request data object;

generating, based on detecting the exception event, a second set of operation recommendations indicating a stage-wise progression of operations that resolve the exception event; and transmitting, the second set of operation recommendations for display on a first computing device.

2. The method of claim 1, further comprising:
generating at least the context data associated with the digital request data object, the context data indicating one or more exception events or a processing stage associated with the digital request data object; and initiating, using the one or more computing device processors, display of the context data associated with the digital request data object on a first graphical user interface comprising a consolidation of a plurality of graphical user interfaces associated with the first application.

3. The method of claim 2, further comprising automatically formatting, using the one or more computing device processors, one or more of:
the first computing operation result for display on the first graphical user interface based on the context data; or
the second set of operation recommendations with an associated second application that is generated based on the first operation recommendation or the context data.

4. The method of claim 1, wherein the first input command comprises a natural language input.

5. The method of claim 1, wherein the digital assistant is associated with the multi-application network such that the multi-application network is configured for inter-domain or multi-application data processing associated with the digital request data object using the first input command or a second input command.

6. The method of claim 1, wherein the first application comprises one of:
an application native to the multi-application network;
an application that is not native to the multi-application network; or improving at least one the first operation recommendation and the second operation recommendation over time, based on learning.

7. The method of claim 1, wherein the digital request data object comprises a document or a file outlining one or more of:
account data associated with the digital request data object; or
parametric data associated with resolving the one or more exception events associated with the digital request data object.

8. The method of claim 7, wherein the parametric data comprises one or more of:
identifier data associated with the digital request data object;
quantitative data associated with the digital request data object; or
exception event data associated with the digital request data object.

9. The method of claim 1, wherein the data model is configured to:
track or assimilate a trajectory of a plurality of input commands including the first input command leading to a selection of specific operation recommendations including the first operation recommendation; and
recommend the second set of operation recommendations for display on a graphical user interface associated with the computing device, wherein:
the second set of operation recommendations comprising a second operation having an associated second application that executes the second operation recommendation via the second application programming interface to generate the second computing operation result.

10. The digital assistant of claim 1, wherein the data model comprises a large language model.

11. An apparatus for implementing a digital assistant in a multi-application network, the apparatus comprising:
one or more computing system processors; and
memory storing instructions that, when executed by the one or more computing system processors, causes the apparatus to:
receive, via an interrogator control input field, an input command from a computing device,
analyze, using a data model, the input command,
determine, based on analyzing the input command, a digital request data object associated with the input command,
resolve, based on analyzing the input command, the input command into a data string,
determine, based on the digital request data object and the data string, intent data,
generate, based on the intent data, a first set of operation recommendations comprising a first operation recommendation and a second operation recommendation,
receive, a selection of the first operation recommendation,
in response to receiving the selection of the first operation recommendation, determine, a first application associated with the first operation recommendation,
determine a first application programming interface associated with the first application,
connect, using the first application programming interface, to the first application, execute, using the first application, the first operation recommendation, thereby resulting in a first computing operation result,
transmit to the computing device, the first computing operation result,
receive a selection of the second operation recommendation,
in response to receiving the selection of the second operation recommendation, determine a second application, different from the first application, associated with the second operation recommendation,
determine the first application programming interface or a second application programming interface associated with the second application,
connect to the second application,
execute the second operation recommendation, thereby resulting in a second computing operation result different from the first computing operation result,
transmit to the computing device, the second computing operation result,
detect, using context data, an exception event associated with the digital request data object,
generate, based on detecting the exception event, a second set of operation recommendations indicating a stage-wise progression of operations that resolve the exception event, and
transmit, the second set of operation recommendations for display on a first computing device.

12. The apparatus of claim 11, wherein the one or more computing system processors execute the instructions to:
generate at least the context data associated with the digital request data object, the context data indicating one or more exception events or a processing stage associated with the digital request data object; and
initiate display of the context data associated with the digital request data object on a graphical user interface comprising a consolidation of a plurality of graphical user interfaces associated with the first application or a plurality of applications associated with the first set of operation recommendations.

13. The apparatus of claim 12, wherein:
the graphical user interface is a single graphical user interface that is configured to display a plurality of analysis data including the first computing operation result;
the plurality of analysis data is generated from analysis operations associated with one or more digital request data objects including the determined digital request data object;
the analysis operations are executed by one or more native or non-native applications associated with the multi-application network; and
the plurality of analysis data or the context data are displayed on the single graphical user interface instead of a plurality of graphical user interfaces associated with the one or more native or non-native applications associated with the multi-application network.

14. The apparatus of claim 12, wherein the one or more computing system processors execute the instructions to automatically format one or more of:
the first computing operation result for display on the graphical user interface based on the context data; or
the second set of operation recommendations that is generated based on the first operation recommendation or the context data.

15. The apparatus of claim 11, wherein the digital request data object comprises a document or a file outlining one or more of:
account data associated with the digital request data object; or
parametric data associated with resolving one or more exception events associated with the digital request data object.

16. The apparatus of claim 15, wherein the parametric data comprises one or more of:
identifier data associated with the digital request data object;
quantitative data associated with the digital request data object; or
exception event data associated with the digital request data object.

17. The apparatus of claim 11, wherein the data model is one of an artificial intelligence language model or a machine learning language model.

18. A method for implementing a digital assistant in a multi-application network, the method comprising:
receiving, using one or more computing device processors, via an interrogator control input field, a natural language input command from a computing device;
analyzing, using the one or more computing device processors, using a language model, the natural language input command;
determining, using the one or more computing device processors, based on analyzing the natural language input command, a digital request data object associated with the natural language input command;
resolving, using the one or more computing device processors and based on analyzing the natural language input command, the natural language input command into a data string;
determining, using the one or more computing device processors, based on the digital request data object and the data string, intent data;
generating, using the one or more computing device processors and based on the intent data, a set of operation recommendations comprising a first operation recommendation and a second operation recommendation;
receiving, using the one or more computing device processors, a selection of the first operation recommendation;
in response to receiving the selection of the first operation recommendation, determining, using the one or more computing device processors, a first application associated with the first operation recommendation and which is comprised in a collection of applications associated with the multi-application network;
determining, using the one or more computing device processors, a first application programming interface associated with the application;
connecting, using the one or more computing device processors and the first application programming interface, to the first application;
executing, using the one or more computing device processors and the first application, the first operation recommendation, thereby resulting in a first computing operation result;
transmitting, using the one or more computing device processors, to the computing device, the first computing operation result;

receiving, using the one or more computing device processors, a selection of the second operation recommendation;

in response to receiving the selection of the second operation recommendation, determining, using the one or more computing device processors, a second application, different from the first application, associated with the second operation recommendation;

determining, using the one or more computing device processors, the first application programming interface or a second application programming interface associated with the second application;

connecting, using the one or more computing device processors and the first application programming interface or the second application programming interface, to the second application;

executing, using the one or more computing device processors and the second application, the second operation recommendation, thereby resulting in a second computing operation result different from the first computing operation result;

transmitting, using the one or more computing device processors, to the computing device, the second computing operation result;

detecting, using context data, an exception event associated with the digital request data object;

generating, based on detecting the exception event, a second set of operation recommendations indicating a stage-wise progression of operations that resolve the exception event; and transmitting, the second set of operation recommendations for display on a first computing device.

\* \* \* \* \*